(12) United States Patent
Hakemi et al.

(10) Patent No.: US 12,291,009 B2
(45) Date of Patent: May 6, 2025

(54) MULTIPLE AND SINGLE LAYERS LIQUID CRYSTAL DISPERSION DEVICES FOR COMMON AND DIRECT GLAZING APPLICATIONS AND METHODS THEREOF

(71) Applicant: GAUZY LTD, Tel-Aviv (IL)

(72) Inventors: Hassan-Ali Hakemi, Macherio (IT); Adrian Lofer, Kfar Saba (IL); Eyal Peso, Bat Yam (IL); Dana Gal-Fuss, Tel Aviv (IL)

(73) Assignee: GAUZY LTD., Tel-Aviv (IL)

( * ) Notice: Subject to any disclaimer, the term of this patent is extended or adjusted under 35 U.S.C. 154(b) by 797 days.

(21) Appl. No.: 17/328,208

(22) Filed: May 24, 2021

(65) Prior Publication Data

US 2021/0276313 A1    Sep. 9, 2021

Related U.S. Application Data

(62) Division of application No. 15/740,587, filed as application No. PCT/IL2016/050703 on Jun. 30, 2016, now abandoned.
(Continued)

(51) Int. Cl.
  B32B 27/08    (2006.01)
  B32B 7/06    (2019.01)
  (Continued)

(52) U.S. Cl.
  CPC ............... *B32B 27/08* (2013.01); *B32B 7/06* (2013.01); *B32B 17/10* (2013.01); *B32B 17/10899* (2013.01); *B32B 27/36* (2013.01); *B32B 37/15* (2013.01); *B32B 37/203* (2013.01); *B32B 37/206* (2013.01); *B32B 38/0008* (2013.01); *B32B 38/0036* (2013.01); *B32B 38/10* (2013.01); *C09K 19/544* (2013.01); *B32B 2037/268* (2013.01);
(Continued)

(58) Field of Classification Search
  CPC .................................. B32B 27/08; B32B 7/06
  See application file for complete search history.

(56) References Cited

U.S. PATENT DOCUMENTS

| 5,223,959 A | 6/1993 | Wu et al. |
| 6,049,366 A | 4/2000 | Hakemi et al. |
(Continued)

FOREIGN PATENT DOCUMENTS

| CN | 1179552 A | 4/1998 |
| CN | 1503034 A | 6/2004 |
(Continued)

OTHER PUBLICATIONS

Machine translation CN1179552A (Year: 1998).*
(Continued)

*Primary Examiner* — Jacob T Minskey
*Assistant Examiner* — Wayne K. Swier
(74) *Attorney, Agent, or Firm* — The Roy Gross Law Firm, LLC; Roy D. Gross

(57) ABSTRACT

The present invention discloses means and methods for manufacturing a multilayer of liquid crystal dispersion film using releasable supporting films and means and methods for manufacturing a haze-free and low-cost multi liquid crystal-layer PDLC, LCDP, PSLC or polymer network using reliable supporting films.

21 Claims, 4 Drawing Sheets

Related U.S. Application Data

(60) Provisional application No. 62/186,409, filed on Jun. 30, 2015.

(51) Int. Cl.

| | | |
|---|---|---|
| *B32B 17/10* | (2006.01) | |
| *B32B 27/36* | (2006.01) | |
| *B32B 37/15* | (2006.01) | |
| *B32B 37/20* | (2006.01) | |
| *B32B 37/26* | (2006.01) | |
| *B32B 38/00* | (2006.01) | |
| *B32B 38/10* | (2006.01) | |
| *C09K 19/54* | (2006.01) | |

(52) U.S. Cl.
CPC ... *B32B 2038/0076* (2013.01); *B32B 2255/10* (2013.01); *B32B 2255/205* (2013.01); *B32B 2255/26* (2013.01); *B32B 2305/55* (2013.01); *B32B 2305/72* (2013.01); *B32B 2307/412* (2013.01); *B32B 2307/748* (2013.01); *B32B 2310/0831* (2013.01); *B32B 2310/0887* (2013.01); *B32B 2367/00* (2013.01); *B32B 2457/00* (2013.01); *B32B 2457/202* (2013.01); *B32B 2605/006* (2013.01); *C09K 2019/546* (2013.01)

(56) References Cited

U.S. PATENT DOCUMENTS

| | | | |
|---|---|---|---|
| 6,130,732 | A | 8/2000 | Crawford et al. |
| 6,271,899 | B1 | 8/2001 | Lewis et al. |
| 6,452,560 | B2 | 9/2002 | Kunysz |
| 6,452,650 | B1 | 9/2002 | Nakao et al. |
| 6,570,633 | B1 | 5/2003 | Stephenson |
| 6,618,104 | B1 | 9/2003 | Date et al. |
| 6,721,023 | B1 | 4/2004 | Weiss et al. |
| 7,969,405 | B2 | 6/2011 | Kwan |
| 8,537,308 | B2 | 9/2013 | Hwang et al. |
| 2005/0106769 | A1 | 5/2005 | Miyata |
| 2007/0126674 | A1 | 6/2007 | Doane et al. |
| 2008/0316395 | A1 | 12/2008 | O'Keeffe |
| 2010/0040804 | A1 | 2/2010 | Zhang |
| 2010/0151228 | A1* | 6/2010 | Chin ............... B32B 27/281 428/323 |
| 2014/0204294 | A1 | 7/2014 | Lv |
| 2014/0218663 | A1 | 8/2014 | Stahl et al. |
| 2016/0102229 | A1 | 4/2016 | Takarada et al. |

FOREIGN PATENT DOCUMENTS

| | | | | |
|---|---|---|---|---|
| CN | 101479105 | A * | 7/2009 | ............ B29C 35/02 |
| CN | 101685216 | A | 3/2010 | |
| CN | 101794043 | A | 8/2010 | |
| CN | 102596414 | A | 7/2012 | |
| CN | 102692763 | A | 9/2012 | |
| CN | 104460079 | A | 3/2015 | |
| EP | 747461 | A1 | 12/1996 | |
| JP | 2012037682 | A | 2/2012 | |
| WO | WO-2005113645 | A1 * | 12/2005 | ............ B32B 15/08 |
| WO | 2009004908 | A1 | 1/2009 | |
| WO | WO-2014100652 | A1 * | 6/2014 | ............ B32B 27/06 |
| WO | WO 2016/147175 | A2 | 9/2016 | |

OTHER PUBLICATIONS

Machine translation WO2005113645A1 (Year: 2005).*
Machine translation CN101479105A (Year: 2009).*
Machine translation CN101685216A (Year: 2010).*
Wikipedia—"Smart Glass", available online: [https://en.wikipedia.org/wiki/Smart_glass].
Chinese Office Action for Chinese Patent Application No. 201680049846.1, dated May 12, 2021, 9pp.
PCT International Search Report for International Application No. PCT/IL1650703, mailed Jan. 19, 2017, 1 pg.
PCT Written Opinion for International Application No. PCT/IL1650703, mailed Jan. 19, 2017, 5pp.
Supplementary European Search Report for EP16817381, completed Jan. 7, 2019, 1pg.

* cited by examiner

MULTIPLE AND SINGLE LAYERS LIQUID CRYSTAL DISPERSION DEVICES FOR COMMON AND DIRECT GLAZING APPLICATIONS AND METHODS THEREOF

CROSS REFERENCE TO RELATED PUBLICATIONS

This application is a divisional of U.S. patent application Ser. No. 15/740,587, filed Dec. 28, 2017, which is a National Phase filing under 35 U.S.C. 371 of PCT Patent Application No. PCT/IL16/50703, filed Jun. 30, 2016, and claims priority from U.S. Provisional Patent Application No. 62/186, 409, filed Jun. 30, 2015, all of which are incorporated by reference in their entirety.

BACKGROUND OF THE INVENTION

This invention relates to liquid crystal films, more specifically to liquid crystal films comprising multiple layers of liquid crystals and methods of manufacturing the same.

In liquid crystal dispersion devices, liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic, which include a thin layer of a transparent, conductive material followed by curing of the polymer, thereby forming the basic sandwich structure of the smart window. This structure is in effect a capacitor.

Electrodes from a power supply are attached to the transparent electrodes. With no applied voltage, the liquid crystals are randomly arranged in the droplets, resulting in scattering of light as it passes through the smart window assembly. This results in the translucent, "milky white", appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used. It is also possible to create fire-rated and anti-X-Ray versions for use in special applications. Most of the devices offered today operate in on or off states only, even though the technology to provide for variable levels of transparency is easily applied. This technology has been used in interior and exterior settings for privacy control (for example conference rooms, intensive-care areas, bathroom/shower doors) and as a temporary projection screen. It is commercially available in rolls as adhesive backed Smart film that can be applied to existing windows and trimmed to size in the field (http://en.wikipedia.org/wiki/Smart_glass #Polymer_dispersed_liquid_crystal_devices—incorporated herein as reference).

Usually, Polymer Dispersed Liquid Crystal (PDLC) devices are made of a single layer of liquid crystal dispersions. In case a person skilled in the art would like to apply more than one liquid crystal layer to a window, it would be necessary to attach multiple "sandwiches" of PDLC. This conformation is not optimal since attaching several PDLC films together causes a loss of clarity due to increase in total thickness of the resulting films, complications and high cost of glass lamination of the final window product.

U.S. Pat. No. 7,969,405 B2 discloses a double-sided liquid crystal display (LCD) panel which includes a first polymer dispersed liquid crystal (PDLC) layer configured to be responsive to an applied DC voltage for making the first PDLC layer substantially transparent; a center liquid crystal cell layer; a second PDLC layer configured to be responsive to an applied DC voltage for making the second PDLC layer substantially transparent; and an LCD control module configured to control the first and second PDLC layers such that the center liquid crystal cell layer is viewable from a selected viewing side. Depending on the selected viewing side, the LCD control module is configured to select one of the first and second PDLC layers to make substantially transparent, and the other of the first and second PDLC layers to make substantially translucent. A light source may be applied to a side of a translucent one of the PDLC layers to provide a backlight for the center liquid crystal layer. In this invention, the double-sided LCD panel is made of two independent PDLC layers, each one having their own couple of transparent conductive material sandwiching the liquid crystal layer.

U.S. Pat. No. 6,721,023 B1 provides a multi-layered imaging device for three-dimensional image display, including a plurality of two-dimensional layers superposed in the third dimension, each of the layers having two major surfaces and at least one peripheral edge, the layers being made of a material selected from the group of non-conventional, polarizer-free liquid crystal materials including polymer-dispersed liquid crystals (PDLC) and derivatives and combinations thereof, wherein the exposure of at least one of the layers to illumination allows the transmission of light with minimal losses, facilitating utilization of a maximal number of layers for imaging a three-dimensional display.

U.S. Pat. No. 6,271,899 B1 discloses a tunable filter in particular for use in the visible or near infrared wavelength region, comprising a nano dispersed composite material contained within a resonant cavity structure comprising dielectric mirrors, where the material is polarizable by means of an applied electric field. In particular, the polarizable material may be a nano phase polymer dispersed liquid crystal (PDLC) material where the diameter of liquid crystal droplets within the material is less than 0.1 m, and for use in the visible wavelength region is typically between 10 nm and 50 nm. The filter also comprises structure for applying a variable electric field across the faces of the material. The transmission-wavelength characteristic of the filter is such that maxima and minima are shifted in wavelength by varying the electric field. It is shown in FIG. 9, that a multi-layer of liquid crystal is divided by several ITO layers.

U.S. Pat. No. 6,618,104 B1 discloses an optical device and a display apparatus of the present invention are constructed so as to improve display characteristics of output light intensity, display contrast, and reduction of scattered light due to external light, and also to provide a large-screen. The optical device has a first stacked body and a plurality of second stacked bodies. The first stacked body includes a light guide, a first electrode, and an optical control layer. The second stacked body includes a plurality of second electrodes, the reflection film and a substrate. A plurality of third electrodes are provided through the substrate. Each of the third electrode has a first end part connecting to the second electrode and a second end part exposed to the other side of the substrate. A further light absorption film may be disposed between the reflection film and the second electrode. It is shown in FIG. 7b, that a multi-layer of liquid crystal is divided by several transparent polymer resins.

U.S. Pat. No. 6,570,633 B1 discloses a multi-layer, neutral-density sheet with memory properties, includes a transparent substrate and a transparent, electrically conductive layer formed over the transparent substrate. The multi-layer sheet further includes a plurality of light modulating layers formed over the transparent electrically conductive layer, each light modulating layer being formed of polymer with a dispersion of cholesteric liquid crystal material having memory properties and selected so that in combination with cholesteric liquid crystal in other layers are controllable between a first, light reflecting neutral-density state and the second transparent state.

U.S. Pat. No. 5,223,959 A discloses the product of a liquid crystal display (LCD) device and the method of making same, wherein the resultant product is an improved color oriented LCD in which the liquid crystal material and the color dye material are intimately comingled within an enclosure of polymer material and/or encapsulated within the structure of microdroplets. The resulting color displayed by this LCD device is controlled by the selective application of electrical parameters, namely, voltage and frequency, to permit the droplets within a display device to absorb, scatter, or transmit light, and/or color, or mixture of colors, determined by the dye materials and the applied electrical parameters employed.

All of the above prior art citations lack the essential technology of providing means and methods to provide a true liquid crystal multilayer in a PDLC device. Therefore there is long felt need for this kind of inventive technology.

SUMMARY OF THE INVENTION

It is hence one object of the invention to disclose a method for manufacturing a multilayer of liquid crystal dispersion in a polymer matrix film, comprising the steps of: providing materials for producing a PDLC, LCDP, PSLC or polymer network film, comprising: at least one first releasable supporting film; at least one liquid crystal dispersion; at least one second supporting film; allocating said liquid crystal dispersion between said at least one first releasable supporting film and said at least one second supporting film, thereby forming a PDLC, LCDP, PSLC or polymer network film; curing said PDLC, LCDP, PSLC or polymer network film by means of UV light, electron beam light or heat; detaching said at least one releasable supporting film; providing materials for producing at least one second layer of liquid crystal in said PDLC, LCDP, PSLC or polymer network film, comprising: a third supporting film; a second liquid crystal dispersion; allocating said second liquid crystal dispersion between said third supporting film and said PDLC film, thereby forming a multilayer PDLC film; curing said multilayer PDLC, LCDP, PSLC or polymer network film by means of UV or electron beam light; wherein any of said supporting films can be releasable supporting films.

A further object of the invention is to disclose the method for manufacturing a liquid crystal device wherein said liquid crystal device selected from a group consisting of PDLC, LCDP, PSLC or polymer network.

A further object of the invention is to disclose the method for manufacturing a liquid crystal device wherein said liquid crystal type is nematic, cholesteric (chiral nematic) or smectic.

A further object of the invention is to disclose the method for manufacturing a liquid crystal device wherein said liquid crystal is characterized by a morphology in polymer matrix of nano-droplet, micro-droplets or macro-droplets.

A further object of the invention is to disclose the method for manufacturing a liquid crystal device wherein said liquid crystal could be made by phase separation methods.

A further object of the invention is to disclose the method for manufacturing a liquid crystal device wherein said liquid crystal could be made by micro-encapsulation methods.

A further object of the invention is to disclose the method for manufacturing a liquid crystal device wherein said step of providing liquid crystal dispersion further comprises a step of introducing dichroic organic and metal-organic dye into said liquid crystal dispersion.

A further object of the invention is to disclose the method for manufacturing a liquid crystal device wherein said releasable supporting are about 10-50 micron thick.

A further object of the invention is to disclose the method for manufacturing a liquid crystal device wherein said step of providing liquid crystal dispersion further comprises a step of introducing nematic mixtures for static solar-reflection mode into said liquid crystal dispersion.

A further object of the invention is to disclose the method for manufacturing a liquid crystal device wherein said step of providing liquid crystal dispersion further comprises a step of introducing broad-band cholesteric materials for dynamic solar-reflection mode into said liquid crystal dispersion.

A further object of the invention is to disclose the method for manufacturing a liquid crystal device wherein said step of providing liquid crystal dispersion further comprises a step of introducing metal-organic mesogens into said liquid crystal dispersion.

A further object of the invention is to disclose the method for manufacturing a liquid crystal device further comprising a step of providing a dimmer and switch adapted for driving a capacitive or complex capacitive-resistive load.

A further object of the invention is to disclose the method for manufacturing a liquid crystal device wherein said supporting films can be coated with an enhanced reflective film.

A further object of the invention is to disclose the method for manufacturing a liquid crystal device wherein said multilayer PDLC film comprises a pattern.

A further object of the invention is to disclose the method for manufacturing a liquid crystal device wherein said multilayer PDLC film comprises a low-definition display or signage.

A further object of the invention is to disclose the method for manufacturing a liquid crystal device wherein said multilayer PDLC, LCDP, PSLC or polymer network film is bi-stable.

A further object of the invention is to disclose the method for manufacturing a liquid crystal device wherein said PDLC reduces it thickness from about 50-100 micron to 50-10 micron due to the final matrix curing and cross-linking by lamination under heat and pressure.

A further object of the invention is to disclose the method further comprising the step of retrofitting said film into an already existing surface.

It is hence another object of the invention to disclose a multi liquid crystal-layer PDLC, LCDP, PSLC or polymer network film prepared by a method comprising the steps of: providing materials for producing a PDLC, LCDP, PSLC or polymer network film, comprising: at least one first releasable supporting film; at least one liquid crystal dispersion; at least one second supporting film; allocating said liquid crystal dispersion between said at least one first releasable supporting film and said at least one second supporting film, thereby forming a PDLC film; curing said PDLC film by means of UV, electron beam light or heat; detaching said at least one releasable supporting film; providing materials for producing at least one second layer of liquid crystal in said PDLC film, comprising: a third supporting film; a second liquid crystal dispersion; allocating said second liquid crystal dispersion between said third supporting film and said PDLC, LCDP, PSLC or polymer network film, thereby forming a multilayer PDLC, LCDP, PSLC or polymer network film; curing said multilayer PDLC, LCDP, PSLC or polymer network film by means of UV, electron beam light or heat; wherein any of said supporting films can be releasable supporting films.

A further object of the invention is to disclose the multi liquid crystal-layer PDLC, LCDP, PSLC or polymer network wherein said liquid crystal device selected from a group consisting of PDLC, LCDP, PSLC or polymer network.

A further object of the invention is to disclose the multi liquid crystal-layer PDLC, LCDP, PSLC or polymer network wherein said liquid crystal is nematic, cholesteric (chiral nematic or smectic.

A further object of the invention is to disclose the multi liquid crystal-layer PDLC, LCDP, PSLC or polymer network wherein said liquid crystal is characterized by a morphology in polymer matrix of nano-droplets, micro-droplets or macro-droplets.

A further object of the invention is to disclose the multi liquid crystal-layer PDLC, LCDP, PSLC or polymer network wherein said liquid crystal could be made by phase separation methods.

A further object of the invention is to disclose the multi liquid crystal-layer PDLC, LCDP, PSLC or polymer network wherein said liquid crystal could be made by micro-encapsulation methods.

A further object of the invention is to disclose the multi liquid crystal-layer PDLC, LCDP, PSLC or polymer network wherein said step of providing liquid crystal dispersion further comprises a step of introducing dichroic organic and metal-organic dye into said liquid crystal dispersion.

A further object of the invention is to disclose the multi liquid crystal-layer PDLC, LCDP, PSLC or polymer network wherein said releasable supporting are about 10-50 micron thick A further object of the invention is to disclose the multi liquid crystal-layer PDLC, LCDP, PSLC or polymer network wherein said step of providing liquid crystal dispersion further comprises a step of introducing nematic mixtures for static solar-reflection mode into said liquid crystal dispersion.

A further object of the invention is to disclose the multi liquid crystal-layer PDLC, LCDP, PSLC or polymer network wherein said step of providing liquid crystal dispersion further comprises a step of introducing broad-band cholesteric materials for dynamic solar-reflection mode into said liquid crystal dispersion.

A further object of the invention is to disclose the multi liquid crystal-layer PDLC, LCDP, PSLC or polymer network wherein said step of providing liquid crystal dispersion further comprises a step of introducing metal-organic mesogens into said liquid crystal dispersion.

A further object of the invention is to disclose the multi liquid crystal-layer PDLC, LCDP, PSLC or polymer network, further comprising a step of providing a dimmer and switch adapted for driving a capacitive or complex capacitive-resistive load.

A further object of the invention is to disclose the multi liquid crystal-layer PDLC, LCDP, PSLC or polymer network wherein said supporting films can be coated with an enhanced reflective film.

A further object of the invention is to disclose the multi liquid crystal-layer PDLC, LCDP, PSLC or polymer network wherein said multilayer PDLC film comprises a pattern.

A further object of the invention is to disclose the multi liquid crystal-layer PDLC, LCDP, PSLC or polymer network wherein said multilayer PDLC, LCDP, PSLC or polymer network film comprises a low-definition display or signage.

A further object of the invention is to disclose the multi liquid crystal-layer PDLC, LCDP, PSLC or polymer network wherein said multilayer PDLC film is bi-stable.

A further object of the invention is to disclose the multi liquid crystal-layer PDLC, LCDP, PSLC or polymer network wherein said PDLC reduces it thickness from about 50-100 micron to 50-10 micron due to the final matrix curing and cross-linking by lamination under heat and pressure.

A further object of the invention is to disclose the multi liquid crystal-layer PDLC, LCDP, PSLC or polymer network wherein said film can be a stand-alone device or retrofitted into an already existing surface.

It is hence another object of the invention to disclose a method for manufacturing a low-cost and haze-free multilayer of liquid crystal dispersion in a polymer matrix film, comprising the steps of: providing materials for producing a PDLC, LCDP, PSLC or polymer network film, comprising: at least one first releasable supporting film; at least one liquid crystal dispersion; at least one second supporting film; allocating said liquid crystal dispersion between said at least one first releasable supporting film and said at least one second supporting film, thereby forming a PDLC, LCDP, PSLC or polymer network film; curing said PDLC, LCDP, PSLC or polymer network film by means of UV light, electron beam light or heat; detaching said at least one releasable supporting film; providing materials for producing at least one second layer of liquid crystal in said PDLC, LCDP, PSLC or polymer network film, comprising: a third supporting film; a second liquid crystal dispersion; allocating said second liquid crystal dispersion between said third supporting film and said PDLC film, thereby forming a multilayer PDLC film; curing said multilayer PDLC, LCDP, PSLC or polymer network film by means of UV or electron beam light; wherein any of said supporting films can be releasable supporting films; further wherein said steps of curing are partially completed in order to achieve a semi-rigid layer of liquid crystal; and further wherein a final step of detaching said releasable supporting films and enclosing the remaining said liquid crystal layers in two metallized supporting glasses, thereby making a low-cost haze free direct-glazing PDLC.

A further object of the invention is to disclose the method for manufacturing a low-cost and haze-free multilayer of liquid crystal dispersion in a polymer matrix film wherein said liquid crystal device selected from a group consisting of PDLC, LCDP, PSLC or polymer network.

A further object of the invention is to disclose the method for manufacturing a low-cost and haze-free multilayer of liquid crystal dispersion in a polymer matrix film wherein said liquid crystal type is nematic, cholesteric (chiral nematic or smectic.

A further object of the invention is to disclose the method for manufacturing a low-cost and haze-free multilayer of liquid crystal dispersion in a polymer matrix film wherein said liquid crystal is characterized by a morphology in polymer matrix of nano-droplet, micro-droplets or macro-droplets.

A further object of the invention is to disclose the method for manufacturing a low-cost and haze-free multilayer of liquid crystal dispersion in a polymer matrix film wherein said liquid crystal could be made by phase separation methods.

A further object of the invention is to disclose the method for manufacturing a low-cost and haze-free multilayer of liquid crystal dispersion in a polymer matrix film wherein said liquid crystal could be made by micro-encapsulation methods.

A further object of the invention is to disclose the method for manufacturing a low-cost and haze-free multilayer of liquid crystal dispersion in a polymer matrix film wherein said liquid crystal dispersion comprises highly adhesive and cross-linkable elastomer or composites of elastomer/plastic materials.

A further object of the invention is to disclose the method for manufacturing a low-cost and haze-free multilayer of liquid crystal dispersion in a polymer matrix film wherein said liquid crystal dispersion comprises acrylic, urethane, epoxy or their composites.

A further object of the invention is to disclose the method for manufacturing a low-cost and haze-free multilayer of liquid crystal dispersion in a polymer matrix film wherein said step of providing liquid crystal dispersion further comprises a step of introducing dichroic organic and metal-organic dye into said liquid crystal dispersion.

A further object of the invention is to disclose the method for manufacturing a low-cost and haze-free multilayer of liquid crystal dispersion in a polymer matrix film wherein said releasable supporting are about 10-50 micron thick.

A further object of the invention is to disclose the method for manufacturing a low-cost and haze-free multilayer of liquid crystal dispersion in a polymer matrix film wherein said step of providing liquid crystal dispersion further comprises a step of introducing nematic mixtures for static solar-reflection mode into said liquid crystal dispersion.

A further object of the invention is to disclose the method for manufacturing a low-cost and haze-free multilayer of liquid crystal dispersion in a polymer matrix film wherein said step of providing liquid crystal dispersion further comprises a step of introducing broad-band cholesteric materials for dynamic solar-reflection mode into said liquid crystal dispersion.

A further object of the invention is to disclose the method for manufacturing a low-cost and haze-free multilayer of liquid crystal dispersion in a polymer matrix film wherein said step of providing liquid crystal dispersion further comprises a step of introducing metal-organic mesogens into said liquid crystal dispersion.

A further object of the invention is to disclose the method for manufacturing a low-cost and haze-free multilayer of liquid crystal dispersion in a polymer matrix film further comprising a step of providing a dimmer and switch adapted for driving a capacitive or complex capacitive-resistive load.

A further object of the invention is to disclose the method for manufacturing a low-cost and haze-free multilayer of liquid crystal dispersion in a polymer matrix film wherein said supporting films can be coated with an enhanced reflective film.

A further object of the invention is to disclose the method for manufacturing a low-cost and haze-free multilayer of liquid crystal dispersion in a polymer matrix film wherein said multilayer PDLC, LCDP, PSLC or polymer network film comprises a pattern.

A further object of the invention is to disclose the method for manufacturing a low-cost and haze-free multilayer of liquid crystal dispersion in a polymer matrix film wherein said multilayer PDLC, LCDP, PSLC or polymer network film comprises a low-definition display or signage.

A further object of the invention is to disclose the method for manufacturing a low-cost and haze-free multilayer of liquid crystal dispersion in a polymer matrix film wherein said multilayer PDLC, LCDP, PSLC or polymer network film is bi-stable.

A further object of the invention is to disclose the method for manufacturing a low-cost and haze-free multilayer of liquid crystal dispersion in a polymer matrix film wherein said PDLC, LCDP, PSLC or polymer network reduces it thickness from about 50-100 micron to 50-10 micron due to the final matrix curing and cross-linking by lamination under heat and pressure.

A further object of the invention is to disclose the method for manufacturing a low-cost and haze-free multilayer of liquid crystal dispersion in a polymer matrix film further comprising the step of retrofitting said film into an already existing surface.

It is hence another object of the invention to disclose a haze-free and low-cost multi liquid crystal-layer PDLC, LCDP, PSLC or polymer network prepared by a method comprising the steps of: providing materials for producing a PDLC, LCDP, PSLC or polymer network film, comprising: at least one first releasable supporting film; at least one liquid crystal dispersion; at least one second supporting film; allocating said liquid crystal dispersion between said at least one first releasable supporting film and said at least one second supporting film, thereby forming a PDLC film; curing said PDLC film by means of UV, electron beam light or heat; detaching said at least one releasable supporting film; providing materials for producing at least one second layer of liquid crystal in said PDLC film, comprising: a third supporting film; a second liquid crystal dispersion; allocating said second liquid crystal dispersion between said third supporting film and said PDLC, LCDP, PSLC or polymer network film, thereby forming a multilayer PDLC, LCDP, PSLC or polymer network film; curing said multilayer PDLC, LCDP, PSLC or polymer network film by means of UV, electron beam light or heat; wherein any of said supporting films can be releasable supporting films; further wherein said steps of curing are partially completed in order to achieve a semi-rigid layer of liquid crystal; and further wherein a final step of detaching said releasable supporting films and enclosing the remaining said liquid crystal layers in two metallized supporting glasses, thereby making a low-cost haze free direct-glazing PDLC.

A further object of the invention is to disclose the haze-free and low-cost multi liquid crystal-layer PDLC, LCDP, PSLC or polymer network wherein said liquid crystal device selected from a group consisting of PDLC, LCDP, PSLC or polymer network.

A further object of the invention is to disclose the haze-free and low-cost multi liquid crystal-layer PDLC, LCDP, PSLC or polymer network wherein said liquid crystal type is nematic, cholesteric (chiral nematic or smectic.

A further object of the invention is to disclose the haze-free and low-cost multi liquid crystal-layer PDLC, LCDP, PSLC or polymer network wherein said liquid crystal is characterized by a morphology in polymer matrix of nano-droplets, micro-droplets or macro-droplets.

A further object of the invention is to disclose the haze-free and low-cost multi liquid crystal-layer PDLC, LCDP, PSLC or polymer network wherein said liquid crystal could be made by phase separation methods.

A further object of the invention is to disclose the haze-free and low-cost multi liquid crystal-layer PDLC, LCDP, PSLC or polymer network wherein said liquid crystal could be made by micro-encapsulation methods.

A further object of the invention is to disclose the haze-free and low-cost multi liquid crystal-layer PDLC, LCDP, PSLC or polymer network wherein said liquid crystal dispersion comprises highly adhesive and cross-linkable elastomer or composites of elastomer/plastic materials.

A further object of the invention is to disclose the haze-free and low-cost multi liquid crystal-layer PDLC, LCDP, PSLC or polymer network wherein said liquid crystal dispersion comprises comprise acrylic, urethane, epoxy or their composite types.

A further object of the invention is to disclose the haze-free and low-cost multi liquid crystal-layer PDLC, LCDP, PSLC or polymer network wherein said step of providing liquid crystal dispersion further comprises a step of introducing dichroic organic and metal-organic dye into said liquid crystal dispersion.

A further object of the invention is to disclose the haze-free and low-cost multi liquid crystal-layer PDLC, LCDP, PSLC or polymer network wherein said releasable supporting are about 10-50 micron thick.

A further object of the invention is to disclose the haze-free and low-cost multi liquid crystal-layer PDLC, LCDP, PSLC or polymer network wherein said step of providing liquid crystal dispersion further comprises a step of introducing nematic mixtures for static solar-reflection mode into said liquid crystal dispersion.

A further object of the invention is to disclose the haze-free and low-cost multi liquid crystal-layer PDLC, LCDP, PSLC or polymer network wherein said step of providing liquid crystal dispersion further comprises a step of introducing broad-band cholesteric materials for dynamic solar-reflection mode into said liquid crystal dispersion.

A further object of the invention is to disclose the haze-free and low-cost multi liquid crystal-layer PDLC, LCDP, PSLC or polymer network wherein said step of providing liquid crystal dispersion further comprises a step of introducing metal-organic mesogens into said liquid crystal dispersion.

A further object of the invention is to disclose the haze-free and low-cost multi liquid crystal-layer PDLC, LCDP, PSLC or polymer network further comprising a step of providing a dimmer and switch adapted for driving a capacitive or complex capacitive-resistive load.

A further object of the invention is to disclose the haze-free and low-cost multi liquid crystal-layer PDLC, LCDP, PSLC or polymer network wherein said supporting films can be coated with an enhanced reflective film.

A further object of the invention is to disclose the haze-free and low-cost multi liquid crystal-layer PDLC, LCDP, PSLC or polymer network wherein said multilayer PDLC film comprises a pattern.

A further object of the invention is to disclose the haze-free and low-cost multi liquid crystal-layer PDLC, LCDP, PSLC or polymer network wherein said multilayer PDLC, LCDP, PSLC or polymer network film comprises a low-definition display or signage.

A further object of the invention is to disclose the haze-free and low-cost multi liquid crystal-layer PDLC, LCDP, PSLC or polymer network wherein said multilayer PDLC film is bi-stable.

A further object of the invention is to disclose the haze-free and low-cost multi liquid crystal-layer PDLC, LCDP, PSLC or polymer network wherein said PDLC reduces it thickness from about 50-100 micron to 50-10 micron due to the final matrix curing and cross-linking by lamination under heat and pressure.

A further object of the invention is to disclose the haze-free and low-cost multi liquid crystal-layer PDLC, LCDP, PSLC or polymer network wherein said film can be a stand-alone device or retrofitted into an already existing surface.

DETAILED DESCRIPTION OF THE PREFERRED EMBODIMENTS

The following description is provided, so as to enable any person skilled in the art to make use of the invention and sets forth the best modes contemplated by the inventor of carrying out this invention. Various modifications, however, are adapted to remain apparent to those skilled in the art, since the generic principles of the present invention have been defined specifically to provide a multilayer of liquid crystal in PDLC films. Thus a novel method for creating such films has been obtained.

In the following, the present invention along with embodiments thereof will be described in detail with reference to the drawings.

Retrofit(ting): refers hereinafter to the modification of a conventional window or surface by combining the same in some manner with an enhancement, i.e., a switchable glazing, non-switchable light modulating device, etc.

Figure 1:
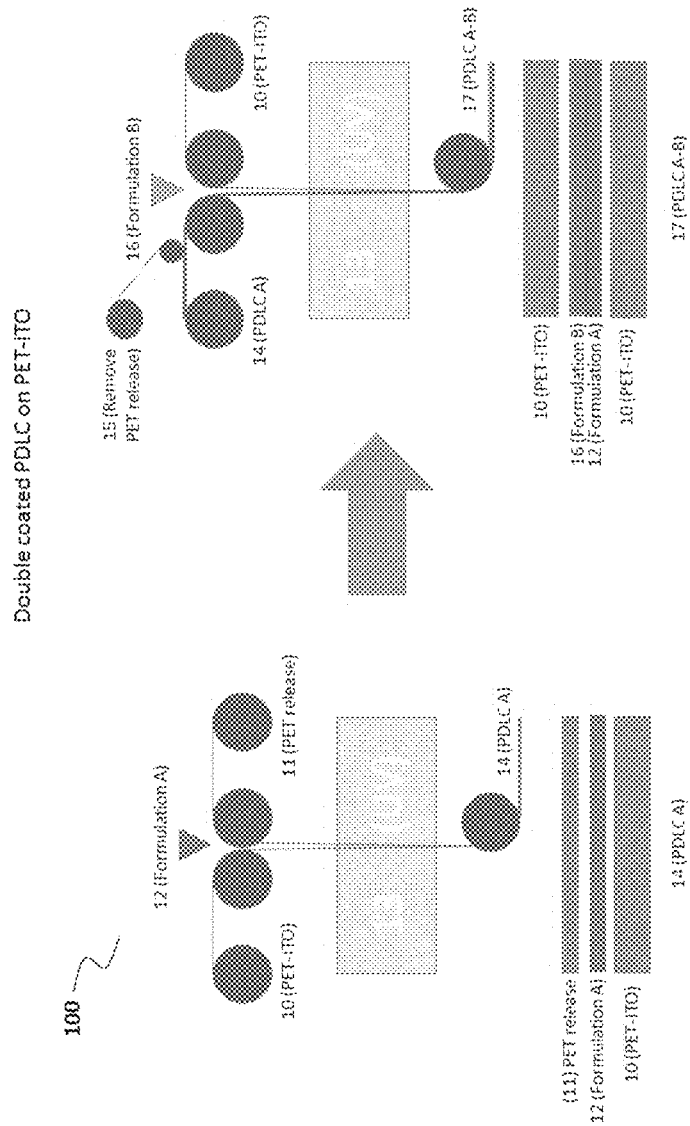
FIG. 1 is a schematic representation of one method to manufacture one preferred embodiment of the present invention.

Referring now to FIG. 1, a schematic illustration of the method 100 for manufacturing one embodiment of the present invention is presented. In this example, a roll-to-roll continuous manufacturing process for the preparation of liquid crystal film is used. One roll is composed by PET-ITO 10 film and the second roll is the novel PET release 11 film. Formulation A 12 is poured between the PET-ITO 10 film and the PET release 11 film. In this example curing is made by means of UV 13. The resulting PDLC (14 PDLC A) is thereby comprised by PET-ITO 10 film, the Formulation A 12 and the PET release 11 film.

The second step of the present invention method comprises the removal 15 of the PET release 11 film from the PDLC A 14. In this example, this process happens when passing in a second roll-to-roll machine when adding the second layer of liquid crystal. So, in one roll there is the previously made PDLC A 14, while the second roll is PET-ITO 10 (or any other support film). A second formulation, Formulation B 16, is poured between PDLC A 14 without the PET release 11 film and the PET-ITO 10. Then the film is cured, again in this case by means of UV 13. The resulting PDLC (17 PDLC A-B) is thereby comprised by PET-ITO 10 film, the Formulation A 12, the Formulation B 16 and PET-ITO 10 film.

Figure 2:
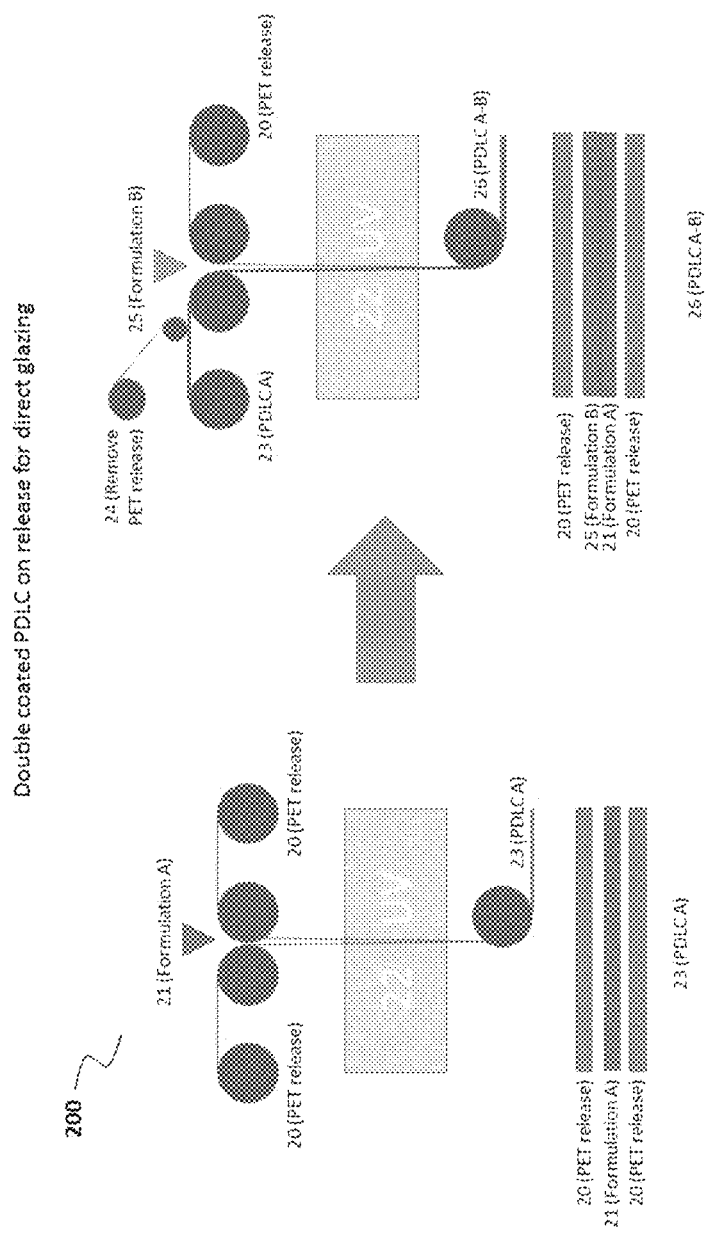
FIG. 2 is a schematic representation of another method to manufacture another preferred embodiment of the present invention.

Referring now to FIG. 2, a schematic illustration of the method 200 for manufacturing one embodiment of the present invention is presented. In this example, a roll-to-roll continuous manufacturing process for the preparation of liquid crystal film is used. Both rolls are composed by the novel PET release 20 film. Formulation A 21 is poured between the PET release 11 films. In this example curing is made by means of UV 22. The resulting PDLC (23 PDLC A) is thereby comprised by the Formulation A 21 and two PET release 20 films.

The second step of the present invention method comprises the removal 24 of one of the PET release 20 films from the PDLC A 23. In this example, this process happens when passing in a second roll-to-roll machine when adding the second layer of liquid crystal. So, in one roll there is the previously made PDLC A 23, while the second roll is PET release 20 film (or any other support film). A second formulation, Formulation B 25, is poured between PDLC A 23 without one PET release 11 film and the PET release 20 film. Then the film is cured, again in this case by means of UV 22. The resulting PDLC (26 PDLC A-B) is thereby comprised by PET release 20 film, the Formulation A 12, the Formulation B 16 and PET release 20 film.

The aforementioned examples provided in FIG. 1 and FIG. 2 can be repeated "n" times, in order to add "n" layers of different morphology of liquid crystal, as necessary.

It is another scope of the present invention to provide a method to manufacture a double-release single-layer and/or multi-layer PDLC preform film for direct glazing. The main characteristics of said film is that is manufactured at low-cost materials (no ITO-PET and two ITO-glasses), the process is simple and at low costs (double-release), the result is a simple and low-cost PDLC glazing (direct PDLC layer lamination on two ITO-glasses) with a significant PDLC haze reduction during glazing (LC droplet deformation), which provides the final product of a low-cost PDLC film and glazing product.

One example of the manufacture process is summarized as follows:
1. Coating of a mixture of liquid crystal and a UV-curable/ 18hermoset prepolymers between two non-metallized release sheets, each having 10-50 micron thickness.
2. The prepolymers will consist of highly adhesive and cross-linkable elastomer or composites of elastomer/plastic materials.
3. The prepolymers of PDLC preform will comprise acrylic, urethane, epoxy or their composite types.
4. Phase separation & partial UV curing of the UV-curable portion of PDLC layer to produce a partially-cured PDLC preform film.
5. The partially-cured PDLC preform could consist of single-layer or multi-layers with various morphologies.
6. The morphology of LC inclusions in single-layer or multi-layers PDLC preform could be nano-droplet, micro-droplet or macro-droplet.
7. The thickness of the partially-cured PDLC layer of preform would be within 50-100 microns range.
8. Collection of preform PDLC film on double-release for on roll or sheet for direct glazing.

Another example for a process for direct glazing of low-cost and haze-free PDLC glass:
1. Peeling off the two release sheets from preform PDLC film.
2. Placing the free-standing PDLC preform layer between two metallized glass supports
3. Final curing of thermoset portion of PDLC preform layer(s) and LC droplets deformation from spherical to non-spherical or discotic shapes by glass lamination under heat & vacuum pressure.
4. The final matrix curing and cross-linking by lamination under heat and pressure will cause the reduction of PDLC layer(s) thickness and deformation of LC droplets (layer before 50-100, after 10-50 um).
5. The deformed shapes of LC droplets will result to extreme reduction or total elimination of haze in the direct glazed PDLC glass.
6. The process cost of direct glazing of PDLC preform will be much less than standard PDLC lamination process.
7. The direct glaze PDLC glass will be a low-cost and haze-free product.

Figure 3:
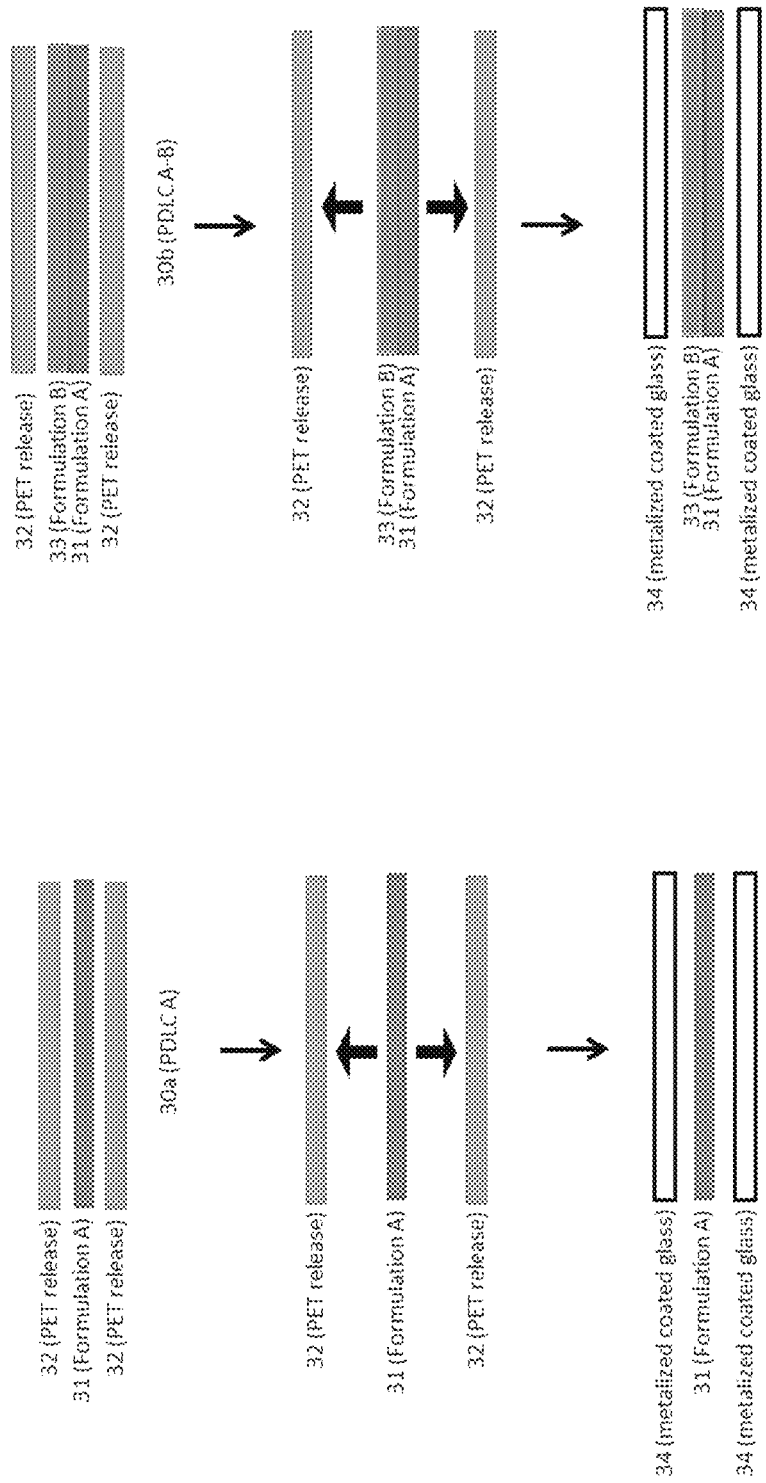
FIG. 3 is a schematic representation of another method to manufacture another preferred embodiment of the present invention.

Referring now to FIG. 3, a schematic illustration of the method of manufacturing a direct glaze PDLC at low-cost and haze-free. In this figure two examples of PDLC are shown, one with one formulation (formulation A-31) of liquid crystal 30a and another with two adjacent formulations (formulation A-31 and B-33) 30b, as previously described in FIG. 2. Both PDLCs comprise PET release sheets 32 on both sides. The next step is to separate the PET-release sheets from the formulations. Then, the just separated formulations are sandwiched between two metallized coated glasses 34.

Figure 4A:
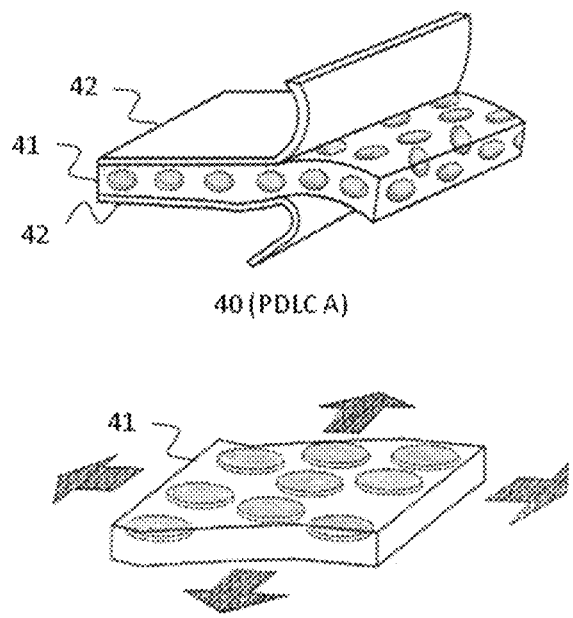
FIGS. 4a-4b are a schematic representation of a method to manufacture another preferred embodiment of the present invention characterized by being haze-free.
Figure 4B:
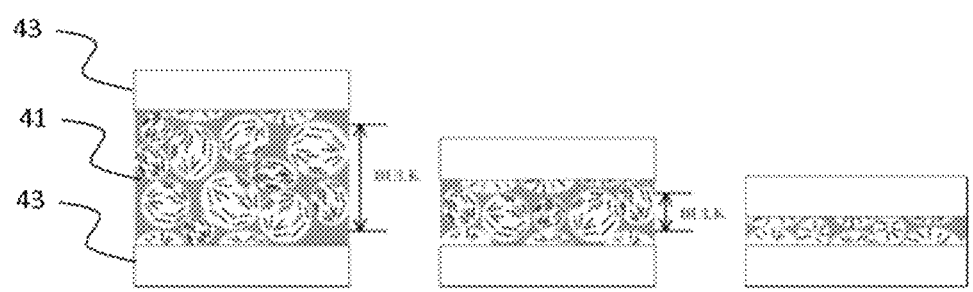

Referring now to FIG. 4a-b, a schematic illustration of the method of eliminating the haze in the low-cost direct glaze PDLC. As shown in FIG. 4a, once we have the PDLC 40 with two releasing sheets 42, the same release sheets 42 are peeled away leaving only the layer of liquid crystal 41. At this point the liquid crystal layer 41 can be stretched (see arrows), or it can be enclosed between two metallized coated glasses 43 and pressed until the final required thickness, as shown in FIG. 4b. This pressure flattens the liquid crystal domains reducing the haze.

In a preferred embodiment, the low-cost and haze-free PDLC can be enclosed between two glasses or may be retrofitted on existing interior and exterior architectural glazing, automotive windows, and other interior glazing. A transparent adhesive may be used to stick the panel to the window, which may be integrated with the panel or separately provided. The panel may also be applied to original windows before installation.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for manufacturing a liquid crystal dispersion in a polymer matrix film, comprising:
   placing a first support film (10) on a first roller;
   placing a release film (11) on a second roller disposed facing said first roller;
   pouring a first liquid crystal formulation (12) between said first support film and said release film while said first support film is on said first roller and said release film is on said second roller;
   rolling said first roller and said second roller so as to entrain said first liquid crystal formulation between said first support film and said release film;
   curing said first liquid crystal formulation, thereby obtaining an initial PDLC film (14);
   wherein said method is a continuous roll-to-roll method and further comprises:
   placing said initial PDLC film on a third roller;
   detaching said release film from said initial PDLC film while said initial PDLC film is on said third roller;
   placing a second support film on a fourth roller disposed facing said third roller;
   subsequent to said step of removing said release film from said initial PDLC film, pouring a second liquid crystal formulation (16) between said initial PDLC film and said second support film while said initial PDLC film is on said third roller and said second support film is on said fourth roller;
   rolling said third roller and said fourth roller so as to entrain said second liquid crystal formulation between said initial PDLC film and said second support film; and,
   curing said second liquid crystal formulation, thereby obtaining a PDLC film comprising two liquid crystal layers disposed between said two support films.

2. The method according to claim 1, wherein said step of curing comprises curing by at least one method selected from the group consisting of irradiating with UV light; irradiating by an electron beam; and heating.

3. The method according to claim 1, wherein said first support film is releasable and said method comprises:
   detaching said first support film and said release film subsequent to said step of curing said first liquid crystal formulation;
   providing two metallized coated glasses; and,
   enclosing said initial PDLC film between said two metallized coated glasses.

4. The method according to claim 1, wherein said first support film and said second support film are releasable and said method comprises:
   detaching said first support film and said second support film subsequent to said step of curing said second liquid crystal formulation;
   providing two metallized coated glasses; and,
   enclosing said final PDLC film between said two metallized coated glasses.

5. The method according to claim 1, wherein said second support film is releasable and said method comprises:
   detaching said second support film;
   performing a procedure for adding a liquid crystal layer to said PDLC film, said procedure comprising:
   placing said PDLC film on a PDLC film roller;
   placing an additional support film on a support film roller;
   pouring an additional liquid crystal formulation between said PDLC film and said additional support film while said PDLC film is on said PDLC film roller and said additional support film is on said support film roller;
   rolling said PDLC film roller and said support film roller so as to entrain said additional liquid crystal formulation between said PDLC film and said additional support film; and,
   curing said additional liquid crystal formulation, thereby obtaining a PDLC film comprising two liquid crystal layers disposed between two support films; and,
   if an additional liquid crystal layer is desired:
   detaching said additional support film; and,
   repeating said procedure for adding a liquid crystal layer to said PDLC film until a PDLC film comprising a predetermined number of liquid crystal layers has been obtained.

6. The method according to claim 5, wherein said step of detaching said support film is performed while said PDLC film is on said PDLC film roller.

7. The method according to claim 5, wherein said step of curing said additional liquid crystal formulation comprises curing by at least one method selected from the group consisting of irradiating with UV light; irradiating by an electron beam; and heating.

8. The method according to claim 1, wherein at least one of said liquid crystal formulations comprises dichroic organic and metal-organic dye.

9. The method according to claim 1, wherein at least one of said liquid crystal formulations comprises a nematic mixture.

10. The method according to claim 1, wherein at least one of said liquid crystal formulations comprises broad-band cholesteric materials.

11. The method according to claim 1, wherein at least one of said liquid crystal formulations comprises metal-organic mesogens.

12. The method according to claim 1, wherein said method comprises providing a dimmer and switch adapted for driving a capacitive or complex capacitive-resistive load.

13. The method according to claim 1, wherein at least one film selected from the group consisting of said release film and said support films is a PET release film.

14. The method according to claim 1, wherein at least one of said support films is a PET-ITO film.

15. The method according to claim 1, wherein at least one of said steps of curing comprises partially curing said liquid crystal formulation in order to achieve a semi-rigid layer of liquid crystal.

16. The method according to claim 1, wherein said liquid crystal formulation comprises a prepolymer comprising a cross-linkable elastomer.

17. The method according to claim 1, wherein said method consists of:
   placing a first support film (10) on a first roller;
   placing a release film (11) on a second roll disposed facing said first roller;
   pouring a first liquid crystal formulation (12) between said first support film and said release film while said first support film is on said first roller and said release film is on said second roller;
   rolling said first roller and said second roller so as to entrain said first liquid crystal formulation between said first support film and said release film;

curing said first liquid crystal formulation, thereby obtaining an initial PDLC film (14);
placing said initial PDLC film on a third roller;
detaching said release film from said initial PDLC film while said initial PDLC film is on said third roller;
placing a second support film on a fourth roller disposed facing said third roller;
subsequent to said step of removing said release film from said initial PDLC film, pouring a second liquid crystal formulation (16) between said initial PDLC film and said second support film while said initial PDLC film is on said third roller and said second support film is on said fourth roller;
rolling said third roller and said fourth roller so as to entrain said second liquid crystal formulation between said initial PDLC film and said second support film; and,
curing said second liquid crystal formulation, thereby obtaining a PDLC film consisting of two liquid crystal layers disposed between said two support films.

18. The method according to claim 17, wherein said first support film is releasable.

19. The method according to claim 4, wherein said first support film and said second support film are releasable and said method consists of:
placing a first support film (10) on a first roller;
placing a release film (11) on a second roller disposed facing said first roller;
pouring a first liquid crystal formulation (12) between said first support film and said release film while said first support film is on said first roller and said release film is on said second roller;
rolling said first roller and said second roller so as to entrain said first liquid crystal formulation between said first support film and said release film;
curing said first liquid crystal formulation, thereby obtaining an initial PDLC film (14);
placing said initial PDLC film on a third roller;
detaching said release film from said initial PDLC film while said initial PDLC film is on said third roller;
placing a second support film on a fourth roller disposed facing said third roller;
subsequent to said step of removing said release film from said initial PDLC film, pouring a second liquid crystal formulation (16) between said initial PDLC film and said second support film while said initial PDLC film is on said third roller and said second support film is on said fourth roller;
rolling said third roller and said fourth roller so as to entrain said second liquid crystal formulation between said initial PDLC film and said second support film;
curing said second liquid crystal formulation, thereby obtaining a PDLC film consisting of two liquid crystal layers disposed between said two support films;
detaching said first support film and said second support film subsequent to said step of curing said second liquid crystal formulation;
providing two metallized coated glasses; and,
enclosing said final PDLC film between said two metallized coated glasses.

20. The method according to claim 5, wherein said second support film is releasable and said method consists of:
placing a first support film (10) on a first roller;
placing a release film (11) on a second roller disposed facing said first roller;
pouring a first liquid crystal formulation (12) between said first support film and said release film while said first support film is on said first roller and said release film is on said second roller;
rolling said first roller and said second roller so as to entrain said first liquid crystal formulation between said first support film and said release film;
curing said first liquid crystal formulation, thereby obtaining an initial PDLC film (14);
placing said initial PDLC film on a third roller;
detaching said release film from said initial PDLC film while said initial PDLC film is on said third roller;
placing a second support film on a fourth roller disposed facing said third roller;
subsequent to said step of removing said release film from said initial PDLC film, pouring a second liquid crystal formulation (16) between said initial PDLC film and said second support film while said initial PDLC film is on said third roller and said second support film is on said fourth roller;
rolling said third roller and said fourth roller so as to entrain said second liquid crystal formulation between said initial PDLC film and said second support film;
curing said second liquid crystal formulation, thereby obtaining a PDLC film consisting of two liquid crystal layers disposed between said two support films;
detaching said second support film;
performing a procedure for adding a liquid crystal layer to said PDLC film, said procedure consisting of:
placing said PDLC film on a PDLC film roller;
placing an additional support film on a support film roller;
pouring an additional liquid crystal formulation between said PDLC film and said additional support film while said PDLC film is on said PDLC film roller and said additional support film is on said support film roller;
rolling said PDLC film roller and said support film roller so as to entrain said additional liquid crystal formulation between said PDLC film and said additional support film; and,
curing said additional liquid crystal formulation, thereby obtaining a PDLC film consisting of two liquid crystal layers disposed between two support films; and,
if an additional liquid crystal layer is desired:
detaching said additional support film; and,
repeating said procedure for adding a liquid crystal layer to said PDLC film until a PDLC film consisting of a predetermined number of liquid crystal layers has been obtained.

21. The method according to claim 20, wherein said step of detaching said support film is performed while said PDLC film is on said PDLC film roller.

* * * * *